Dec. 11, 1962 P. E. FISKE 3,068,417
PULSE STRETCHER AND SHAPER
Filed July 24, 1959
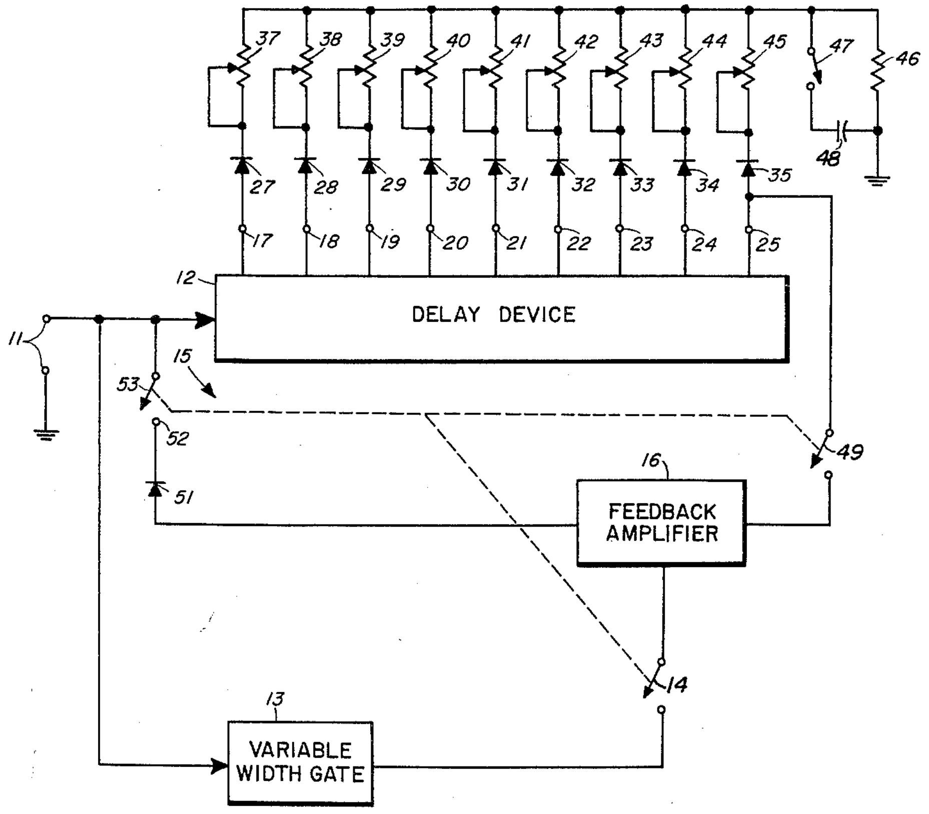
INVENTOR.
PAUL E. FISKE
BY
ATTORNEYS 3,068,417
Patented Dec. 11, 1962

3,068,417

PULSE STRETCHER AND SHAPER

Paul E. Fiske, 1059 Devonshire Drive, San Diego 7, Calif.

Filed July 24, 1959, Ser. No. 829,472
4 Claims. (Cl. 328—55)
(Granted under Title 35, U.S. Code (1952), sec. 266)

The invention described herein may be manufactured and used by or for the Government of the United States of America for governmental purposes without the payment of any royalties thereon or therefor.

The present invention relates to a pulse stretcher and shaper and more particularly to a pulse stretcher and shaper utilizing the passive delay line technique.

The prior art pulse stretchers utilizing the passive delay line technique are exemplified by Patent No. 2,707,751 issued to Harold V. Hance on May 3, 1955. The disadvantages inherent in such systems are many, one of the most common being the extensive utilization of vacuum tubes which are inherently unstable. This, of course, necessitates frequent calibration and adjustment. Another limitation has been the inflexibility of such systems in the maximum obtainable delay or stretch that can be applied to the pulse. Obviously losses in the delay line create a sloping output amplitude which is likewise undesirable. It sometimes becomes necessary to vary the slope of the pulse according to the need of the utilization of the pulse. This of course cannot be accomplished in the type of pulse stretcher disclosed by Hance.

It is thus an object of the present invention to provide a pulse stretcher and shaper requiring a minimum of calibration and adjustment.

Another object is the provision of a pulse stretcher and shaper in which the duration of stretch is not limited by the electrical characteristics of any element of the system.

A further object of the present invention is to provide a pulse stretcher and shaper in which the output slope can be adjusted to any desired shape.

According to the invention a plurality of output taps of equal time delay increments are provided on a delay line, which is terminated in its characteristic impedance to avoid reflection. The pulse to be stretched and shaped is applied at the input of the delay line and outputs are taken from each incremental delay tap, and added in a common load resistance. The input pulse must be at least as long in duration as the incremental delay of each section of the delay line. Rectifying or unidirectional coupling devices are inserted in series with the output taps to avoid any feedback from one output tap to another. Variable impedances are also inserted in series with each output tap to adjust the individual output amplitudes from each delay increment. This last mentioned feature allows not only for compensating the dissipative losses in the delay line, but provides for further pulse shaping as desired in any individual application. A further output is taken from the last delay tap through a unity gain amplifier back to the input terminal. This feeds the pulse back from the last delay tap to the input which allows the pulse to be stretched for a period of time exceeding the total delay time of the delay line. The input pulse can be used to trigger a gating circuit which in turn can be utilized for gating the feedback amplifier. Thus, the instant invention overcomes the disadvantages of the prior art delay line pulse stretchers in that a minimum of active elements has been utilized, provision has been made for overcoming the dissipative losses in the delay line, and the output pulse can be shaped to yield any desired output slope, or, indeed, a discontinuous waveform if desired.

Other objects and many of the attendant advantages of this invention will be readily appreciated as the same becomes better understood by reference to the following detailed description when considered in connection with the accompanying drawing wherein the sole FIGURE shows in block and schematic for a preferred embodiment of the invention.

Referring now to the drawing, input terminal 11 is connected to delay line 12 and variable width gate 13, the output of which is connected through arm 14 of switch 15 to feedback amplifier 16. Delay line 12 has output taps 17 through 25 connected to rectifiers 27 through 35 respectively. Rectifiers 27 through 35 are connected to variable resistors 37 through 45, respectively. The other ends of resistors 37 through 45 are connected to load resistor 46 and through switch 47 to one side of capacitor 48. The other ends of resistor 46 and capacitor 48 are connected to ground.

Output tap 25 of delay line 12 is connected through arm 49 of switch 15 to the input of amplifier 16. The output of amplifier 16 is connected through rectifier 51 to contact 52 of switch 15. Contact arm 53 of switch 15 is connected to the input of delay line 12. Arms 14, 49, and 53 of switch 15 are ganged for simultaneous operation.

*Operation*

The pulse to be stretched and shaped is applied at input terminal 11 and passed down delay line 12. Delay line 12 can be any type of delay line such as the lump-constant variety, the photocell, or the mercury type, etc. Outputs 17, 18, 19, 20, 21, 22, 23, 24, and 25 represent equal increments of additional delay from the starting point. It can thus be seen that if this delay is made equal to the width of the pulse applied at input terminal 11, the output seen at summing or load resistor 46 will be continuous in nature, and of a duration equal to the sum of the incremental delays. Resistors 37 through 45, in conjunction with resistor 46, terminate delay line 12 in its characteristic impedance which eliminates undesirable reflections back down the line. Rectifiers 27 through 35 are inserted in series with each incremental delay output to prevent feedback from occurring between the output taps. Delay line 12 will have a definite attenuation factor dependent upon the quality of the components and type of delay line utilized. This would cause, if not compensated for, a dropping or sloping of output waveform in a negative or decreasing amplitude direction, which, of course, is highly undesirable. Variable resistors 37 through 45 are inserted in series with the output taps to allow individual adjustment for each output tap to compensate for the varying amounts of attenuation as the wavefront passes down the delay line. These variable resistors can also be utilized to give a different output slope than is present at the input waveform. For example, a rising slope may be desirable such as a rising stair step. If a smooth rise is desired capacitor 48 can be inserted in the circuit to give a smoother slope. If a broken discontinuous waveform is desired capacitor 48 can be taken out of the circuit. The width of the input pulse, if made wider than the incremental delay, would merely create overlaps in the waveform thus giving further latitude in the variable output shapes available.

Another novel feature of the present invention lies in the utilization of a feedback amplifier taken from the last delay tap 25 to the input of delay line 12. This is accomplished through switch 15 feeding the output at tap 25 through arm 49 of switch 15 to the input of feedback amplifier 16. Feedback amplifier 16 should have substantially unity gain to overcome any oscillatory possibilities. The output of feedback amplifier 16 is coupled through rectifier 51 and arm 53 of switch 15 to the input of delay line 12. Rectifier 51 is to prevent the input waveform from terminal 11 from getting into feedback amplifier 16. Thus, as the last increment of output waveform is applied at terminal 25, the same waveform is also applied at the input of delay line 12 and the process repeats itself, creating a continuous waveform for as long as desired. A means for terminating length or duration of stretch of the pulse is supplied by variable width gate 13. The input pulse at 12 triggers gate 13 which in turn gates feedback amplifier 16 through switch arm 14 of time switch 15.

It is pointed out that while specific components have been shown in the preferred embodiment of the invention obviously other similar components could be used such as vacuum tube diodes, inductive loads and a different number of delay taps than illustrated. It is also pointed out that for optimum operation as a pulse stretcher the incremental delay spacing should be equal to the width of the input pulse. However, this is not absolutely essential, the essential relationship being that the pulse must be at least as wide as the incremental delay of each tap of the delay line.

Obviously many modifications and variations of the present invention are possible in the light of the above teachings. It is therefore to be understood that within the scope of the appended claims the invention may be practiced otherwise than as specifically described.

What is claimed is:

1. Apparatus for stretching and shaping a fixed duration pulse comprising a delay line having an input connected to the pulse to be stretched and shaped and a plurality of output taps of equal time delay increments, each of said time delay increments being no longer than the duration of the pulse to be stretched and shaped, a separate one of a plurality of unidirectional coupling means connected in the same direction to each of said output taps, a plurality of variable coupling means, one side of each one of said variable coupling means connected to a different one of said unidirectional coupling means, another side of said variable coupling means connected to a common load, and feedback coupling means connected between the last delay tap of said delay line and the input of said delay line.

2. The apparatus for stretching and shaping a fixed duration pulse of claim 1 wherein said feedback coupling means comprises a unity gain amplifier.

3. The apparatus for stretching and shaping a fixed duration pulse of claim 2 and further including gating means for gating said amplifier to an on condition.

4. The apparatus for stretching and shaping a fixed duration pulse of claim 3 wherein said gating means comprises a triggered variable width gate generator, said gate generator connected to said pulse to be stretched and shaped for triggering and to said amplifier for gating said amplifier on.

References Cited in the file of this patent

UNITED STATES PATENTS

| | | |
|---|---|---|
| 2,303,968 | White | Dec. 1, 1942 |
| 2,743,367 | Felch et al. | Apr. 24, 1956 |
| 2,941,152 | Gosslau | June 14, 1960 |
| 2,961,535 | Lanning | Nov. 22, 1960 |